United States Patent
Park et al.

(10) Patent No.: US 11,380,081 B2
(45) Date of Patent: Jul. 5, 2022

(54) IMAGE PROCESSING APPARATUS AND OPERATING METHOD OF THE SAME

(71) Applicant: SAMSUNG ELECTRONICS CO., LTD., Suwon-si (KR)

(72) Inventors: Jaeyeon Park, Suwon-si (KR); Yongsup Park, Suwon-si (KR); Iljun Ahn, Suwon-si (KR); Sangwook Baek, Suwon-si (KR); Minsu Cheon, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 20 days.

(21) Appl. No.: 16/861,428

(22) Filed: Apr. 29, 2020

(65) Prior Publication Data

US 2020/0364486 A1 Nov. 19, 2020

(30) Foreign Application Priority Data

May 16, 2019 (KR) .......................... 10-2019-0057603

(51) Int. Cl.
*G06V 10/40* (2022.01)
*G06K 9/62* (2022.01)
(Continued)

(52) U.S. Cl.
CPC ............ *G06V 10/40* (2022.01); *G06K 9/629* (2013.01); *G06K 9/6232* (2013.01); *G06N 3/08* (2013.01);
(Continued)

(58) Field of Classification Search
None
See application file for complete search history.

(56) References Cited

U.S. PATENT DOCUMENTS 10,083,375 B1 * 9/2018 Kim .......................... G06N 3/08
10,185,891 B1 * 1/2019 Martin ................ G06K 9/4628
(Continued)

FOREIGN PATENT DOCUMENTS

| KR | 10-1287098 B1 | 7/2013 |
| KR | 10-2019-0024689 A | 3/2019 |
| KR | 10-2019-0041921 A | 4/2019 |

OTHER PUBLICATIONS

Du et al, Selective Feature Connection Mechanism: Concatenating Multi-layer CNN Features with a Feature Selector, https://arxiv.org/pdf/1811.06295v1.pdf Nov. 15, 2018 (Year: 2018).*

(Continued)

*Primary Examiner* — Andrae S Allison
(74) *Attorney, Agent, or Firm* — Sughrue Mion, PLLC

(57) ABSTRACT

Provided is an image processing apparatus including a memory storing at least one instruction, and a processor configured to execute the at least one instruction stored in the memory to obtain first feature information by performing a convolution operation on a first image and a first kernel included in a first convolution layer among a plurality of convolution layers, obtain at least one piece of characteristic information, based on the first feature information; obtain second feature information, based on the first feature information and the at least one piece of characteristic information, obtain third feature information by performing a convolution operation on the obtained second feature information and a second kernel included in a second convolution layer that is a layer next to the first convolution layer among the plurality of convolution layers, and obtain an output image, based on the third feature information.

16 Claims, 12 Drawing Sheets

(51) Int. Cl.
*G06N 3/08* (2006.01)
*G06T 5/20* (2006.01)

(52) U.S. Cl.
CPC ...... *G06T 5/20* (2013.01); *G06T 2207/20084* (2013.01)

(56) References Cited

U.S. PATENT DOCUMENTS

| | | | |
|---|---|---|---|
| 10,282,864 B1* | 5/2019 | Kim | G06T 7/10 |
| 10,360,494 B2* | 7/2019 | Wang | G06N 3/04 |
| 10,373,312 B2* | 8/2019 | Abedini | G06T 7/0012 |
| 10,817,990 B1* | 10/2020 | Yang | G06N 3/0454 |
| 2016/0163035 A1* | 6/2016 | Chang | G06K 9/4628 382/149 |
| 2016/0335120 A1* | 11/2016 | Gupta | G06F 9/5044 |
| 2016/0358321 A1* | 12/2016 | Xu | G06N 3/0454 |
| 2017/0206431 A1 | 7/2017 | Sun et al. | |
| 2017/0365038 A1* | 12/2017 | Denton | G06T 5/00 |
| 2018/0130203 A1 | 5/2018 | Abedini et al. | |
| 2018/0150740 A1 | 5/2018 | Wang et al. | |
| 2018/0181838 A1* | 6/2018 | Yang | G06K 9/627 |
| 2018/0268250 A1* | 9/2018 | Drozdova | G06N 3/0454 |
| 2019/0065885 A1 | 2/2019 | Li et al. | |
| 2020/0349673 A1* | 11/2020 | Yoo | G06N 3/08 |

OTHER PUBLICATIONS

Xintao Wang et al., "ESRGAN: Enhanced Super-Resolution Generative Adversarial Networks", ECCV 2018, Computer Vision Foundation, 2018, pp. 1-16.

Xintao Wang et al., "Recovering Realistic Texture in Image Super-resolution by Deep Spatial Feature Transform", Apr. 9, 2018, pp. 1-10.

Christian Ledig et al., "Photo-Realistic Single Image Super-Resolution Using a Generative Adversarial Network", May 25, 2017, 19 pages.

Communication dated May 31, 2021 issued by the Korean Intellectual Property Office in counterpart English Korean Application No. 10-2019-0057603.

Communication dated Jul. 22, 2020 issued by the International Searching Authority in counterpart Application No. PCT/KR2020/005358 (PCT/ISA/220, PCT/ISA/210, and PCT/ISA/237).

Communication dated Dec. 13, 2021 issued by the Korean Intellectual Property Office in counterpart Korean Application No. 10-2019-0057603.

Communication dated Nov. 26, 2021 issued by the European Patent Office in counterpart European Application No. 20805779.4.

Jongchan Park et al., "BAM: Bottleneck Attention Module", arXiv: 1807.06514v2 [cs.CV], Jul. 18, 2018, 14 pages total.

Chunwei Tian et al., "Enhanced CNN for image denoising", CAAI Transactions on Intelligence Technology, IET Journals, The Institution of Engineering and Technology, DOI: 10.1049/trit.2018. 1054, Oct. 2018, XP081128766, 7 pages total.

* cited by examiner

IMAGE PROCESSING APPARATUS AND OPERATING METHOD OF THE SAME

CROSS-REFERENCE TO RELATED APPLICATION

This application is based on and claims priority under 35 U.S.C. § 119 to Korean Patent Application No. 10-2019-0057603, filed on May 16, 2019, in the Korean Intellectual Property Office, the disclosure of which is incorporated by reference herein in its entirety.

BACKGROUND

1. Field

The disclosure relates to an image processing apparatus for processing an image by using a convolution neural network, and an operating method of the same, and more particularly, to an image processing apparatus capable of improving image processing performance, and an operating method of the same.

2. Description of Related Art

With the development of computer technology, data traffic has increased in a form of exponential functions, and artificial intelligence (AI) has become an important trend leading future innovation. Because the AI emulates the way people think, it can be practically applied infinitely to all industries. Representative AI technologies include pattern recognition, machine learning, an expert system, a neural network, and natural language processing.

The neural network models characteristics of human biological neurons via mathematical expressions, and uses an algorithm that emulates the human ability called learning. Through this algorithm, the neural network is able to generate mapping between input data and output data, and the capability of generating such mapping may be called learning capability of the neural network. Also, the neural network has generalization capability of generating correct output data with respect to input data that is not used for learning, based on learned results.

When an image is processed by using a convolution neural network (CNN), because a convolution operation is performed by using only feature information generated in a previous layer, a characteristic that is not obtainable from the feature information generated in the previous layer is unable to be reflected in image processing.

SUMMARY

Provided are an image processing apparatus and an operating method of the same where performance of image processing may be improved by combining feature information obtained from pieces of characteristic information generated as a result of a convolution operation with pieces of existing feature information and using the combined feature information for a convolution operation.

Additional aspects will be set forth in part in the description which follows and, in part, will be apparent from the description, or may be learned by practice of the presented embodiments of the disclosure.

According to an embodiment of the disclosure, an image processing apparatus includes a memory storing at least one instruction, and a processor configured to execute the at least one instruction stored in the memory to obtain first feature information by performing a convolution operation on a first image and a first kernel included in a first convolution layer among a plurality of convolution layers, obtain at least one piece of characteristic information, based on the first feature information; obtain second feature information, based on the first feature information and the at least one piece of characteristic information, obtain third feature information by performing a convolution operation on the obtained second feature information and a second kernel included in a second convolution layer that is a layer next to the first convolution layer among the plurality of convolution layers, and obtain an output image, based on the third feature information.

The processor may be further configured to execute the at least one instruction to obtain the at least one piece of characteristic information from the first feature information by performing filtering or conversion on the first feature information.

The processor may be further configured to execute the at least one instruction to obtain frequency characteristic information regarding the first feature information from the first feature information.

The processor may be further configured to execute the at least one instruction to obtain first sub-feature information from the at least one piece of characteristic information, and obtain the second feature information by combining the first feature information and the first sub-feature information.

The processor may be further configured to execute the at least one instruction to obtain the first sub-feature information from the at least one piece of characteristic information by performing a convolution operation on the at least one piece of characteristic information and a first sub-kernel.

The processor may be further configured to execute the at least one instruction to obtain the second feature information, based on the first feature information, the at least one piece of characteristic information, and the first sub-feature information.

The processor may be further configured to execute the at least one instruction to further obtain second sub-feature information from the at least one piece of characteristic information; and obtain the second feature information, based on the at least one piece of characteristic information, the first feature information, the first sub-feature information, and the second sub-feature information.

The processor may be further configured to execute the at least one instruction to obtain the second sub-feature information from the at least one piece of characteristic information by performing a convolution operation on the at least one piece of characteristic information and a second sub-kernel.

The processor may be further configured to execute the at least one instruction to obtain the second feature information by adding a value obtained by multiplying the first feature information and the first sub-feature information and a value obtained by multiplying the at least one piece of characteristic information and the second sub-feature information.

According to another embodiment of the disclosure, an operating method of an image processing apparatus includes obtaining first feature information by performing a convolution operation on a first image and a first kernel included in a first convolution layer among a plurality of convolution layers, obtaining at least one piece of characteristic information, based on the first feature information, obtaining second feature information, based on the first feature information and the at least one piece of characteristic information, obtaining third feature information by performing a convolution operation on the obtained second feature information and a second kernel included in a second convolution layer that is a layer next to the first convolution layer among the plurality of convolution layers, and obtaining an output image, based on the third feature information.

According to another embodiment of the disclosure, an image processing apparatus includes a memory storing at least one instruction, and a processor configured to execute the at least one instruction stored in the memory to obtain at least one piece of characteristic information from an input signal by filtering or transforming the input signal, obtain first feature information of the input signal, obtain first sub-feature information from the at least one piece of characteristic information by performing a convolution operation on the at least one piece of characteristic information and a first sub-kernel in a convolution layer among a plurality of convolution layers, obtain second sub-feature information from the at least one piece of characteristic information by performing a convolution operation on the at least one piece of characteristic information and a second sub-kernel in a convolution layer among the plurality of convolution layers, obtain second feature information based on the first feature information, the at least one piece of characteristic information, the first sub-feature information, and the second sub-feature information, obtain third feature information from the second feature information by performing a convolution operation on the second feature information and a second kernel included in a convolution layer among the plurality of convolution layers, and obtain an output image, based on the third feature information.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
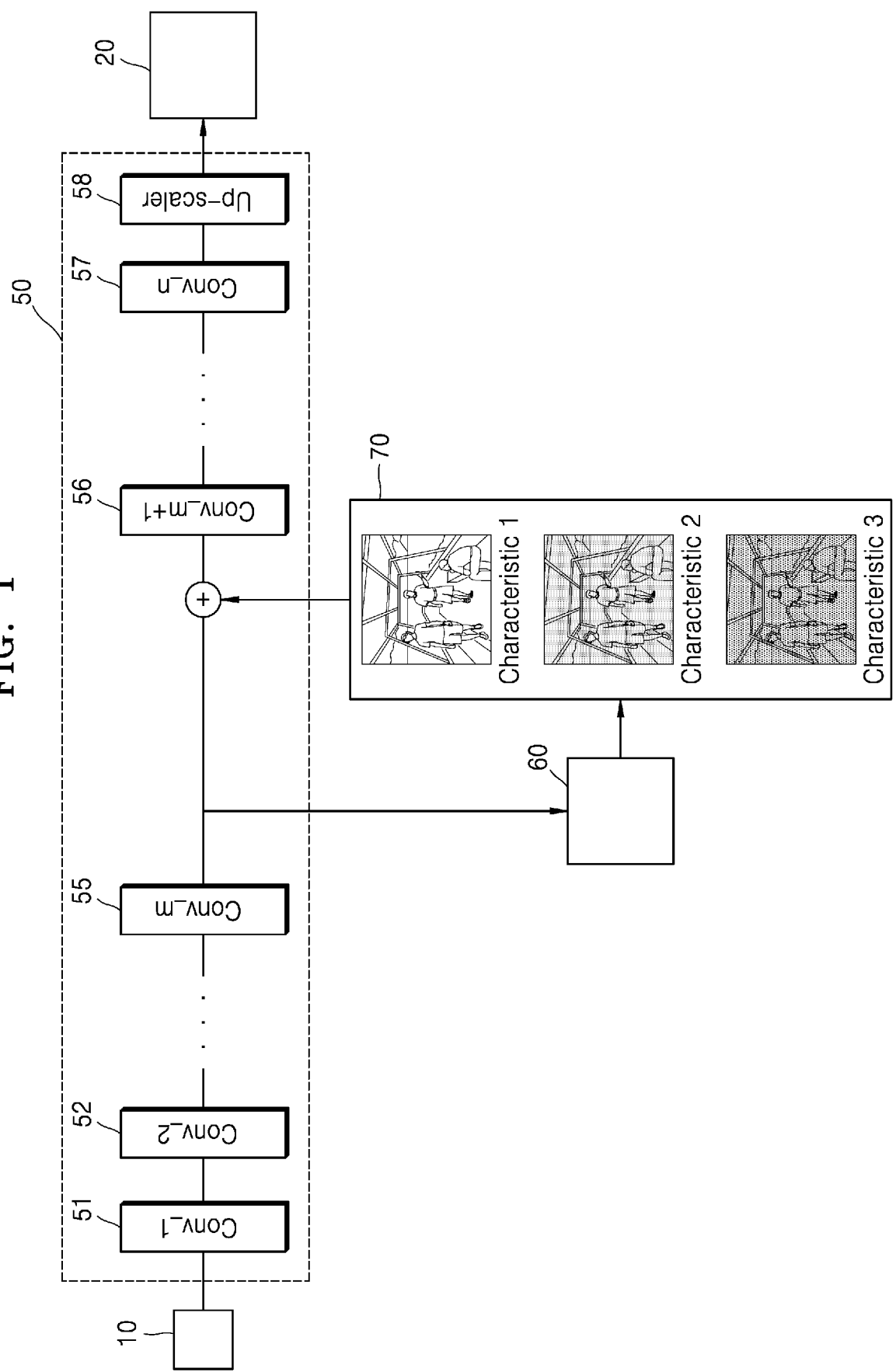
FIG. 1 is a diagram for describing a method, performed by an image processing apparatus, of processing an image by using a convolution neural network, according to an embodiment of the disclosure.

Throughout the disclosure, the expression "at least one of a, b or c" indicates only a, only b, only c, both a and b, both a and c, both b and c, all of a, b, and c, or variations thereof.

The terms used in the specification will be briefly defined, and embodiments of the disclosure will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

When a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or embodied by combining hardware and software.

Hereinafter, embodiments of the disclosure will be described in detail with reference to the accompanying drawings such that one of ordinary skill in the art may easily implement the embodiments of the disclosure. However, the embodiments of the disclosure may be implemented in many different forms and are not limited to those described herein. In the drawings, components not related to the description are omitted for clear description of the disclosure, and like reference numerals in the drawings denote like or similar elements throughout the specification.

FIG. 1 is a diagram for describing a method, performed by an image processing apparatus, of processing an image by using a convolution neural network (CNN) 50, according to an embodiment of the disclosure. The method may be performed by an image processing apparatus 100 illustrated in FIG. 11, which will be described in detail below.

Referring to FIG. 1, the image processing apparatus according to an embodiment of the disclosure may obtain an output image 20 by performing image processing on an input image 10 by using the CNN 50.

Referring to FIG. 1, the CNN 50 may include a plurality of convolution layers. For example, the plurality of convolution layers may include first through n-th convolution layers (Conv_1 through Conv_n) 51 through 57. Also, the input image input to the CNN 50 is a low-resolution image and the output image 20 may be a high-resolution image, and accordingly, the CNN 50 may further include an upscaler 58, but an embodiment of the disclosure is not limited thereto.

In each of the first through n-th convolution layers 51 through 57, a convolution operation may be performed between a kernel and at least one image (feature map) input to the each of the first through n-th convolution layers 51 through 57, and at least one image (or feature map) generated as a result of the convolution operation may be output. Also, at least one feature map output from a current convolution layer may be input to a next convolution layer.

For example, values (for example, feature information) output from the first convolution layer 51 may be input to the second convolution layer 52, and values output from the second convolution layer 52 may be input to the third convolution layer (not shown).

By using the CNN 50, the image processing apparatus 100 may obtain a plurality of pieces of feature information regarding the input image 10 and obtain the output image 20, in which the image processing is performed on the input image 10, based on the obtained pieces of feature information. Here, the image processing may include various types of image processing such as image enhancement, resolution increase, object recognition in an image, detail enhancement, and the like, but is not limited thereto.

The image processing apparatus 100 according to an embodiment of the disclosure may obtain at least one piece of characteristic information, based on first feature information 60 obtained from the m-th convolution layer 55 from among the first through n-th convolution layers 51 through 57. For example, the image processing apparatus 100 may filter the first feature information 60 or perform transform on the first feature information 60 to obtain at least one piece of characteristic information 70 (for example, first characteristic information, second characteristic information, and third characteristic information). This will be described in detail below.

The image processing apparatus 100 may obtain second feature information, based on the at least one piece of characteristic information 70 and the first feature information 60. For example, the image processing apparatus 100 may obtain the second feature information by combining the first feature information 60 and the at least one piece of characteristic information 70. Alternatively, the image processing apparatus 100 may obtain at least one piece of sub-feature information from the at least one piece of characteristic information 70, and obtain the second feature information by combining the first feature information 60 and the at least one piece of sub-feature information. Alternatively, the image processing apparatus 100 may obtain the second feature information by combining the first feature information 60, the at least one piece of characteristic information 70, and the at least one piece of sub-feature information. This will be described in detail below.

The obtained second feature information may be input to the m+1-th convolution layer 56, the input second feature information may be included in the m+1-th convolution layer 56 such that a convolution operation may be performed with a kernel, and the output image 20 may be obtained based thereon.

Here, the m-th convolution layer 55 may include at least one convolution layer from among the first convolution layer 51 through the n−1-th convolution layer (not shown), but is not limited thereto. Also, the at least one piece of characteristic information 70 according to an embodiment of the disclosure may be obtained from the input image 10. For example, the at least one piece of characteristic information 70 may be obtained by filtering the input image 10 or by performing transform on the input image 10.

Figure 2:
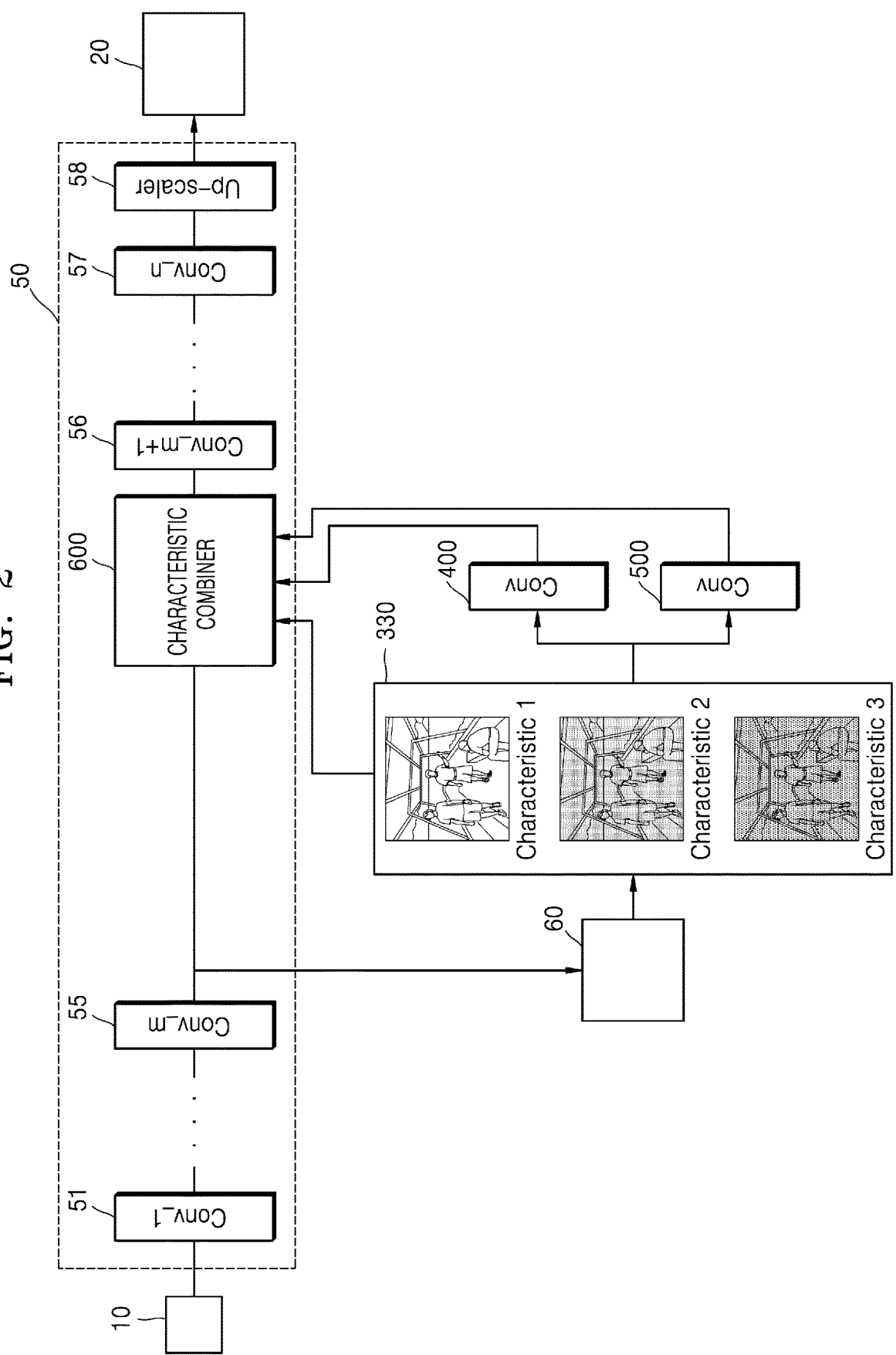
FIG. 2 is a diagram for describing a method, performed by an image processing apparatus, of processing an image, by using a convolution neural network, according to another embodiment of the disclosure.

FIG. 2 is a diagram for describing a method, performed by the image processing apparatus 100, of processing an image, by using the CNN 50, according to another embodiment of the disclosure.

Referring to FIG. 2, the image processing apparatus 100 according to an embodiment of the disclosure may obtain at least one piece of characteristic information 330, based on the first feature information 60 obtained from the m-th convolution layer 55. A method of obtaining the at least one piece of characteristic information 330 will be described with reference to FIG. 3.

Figure 3:
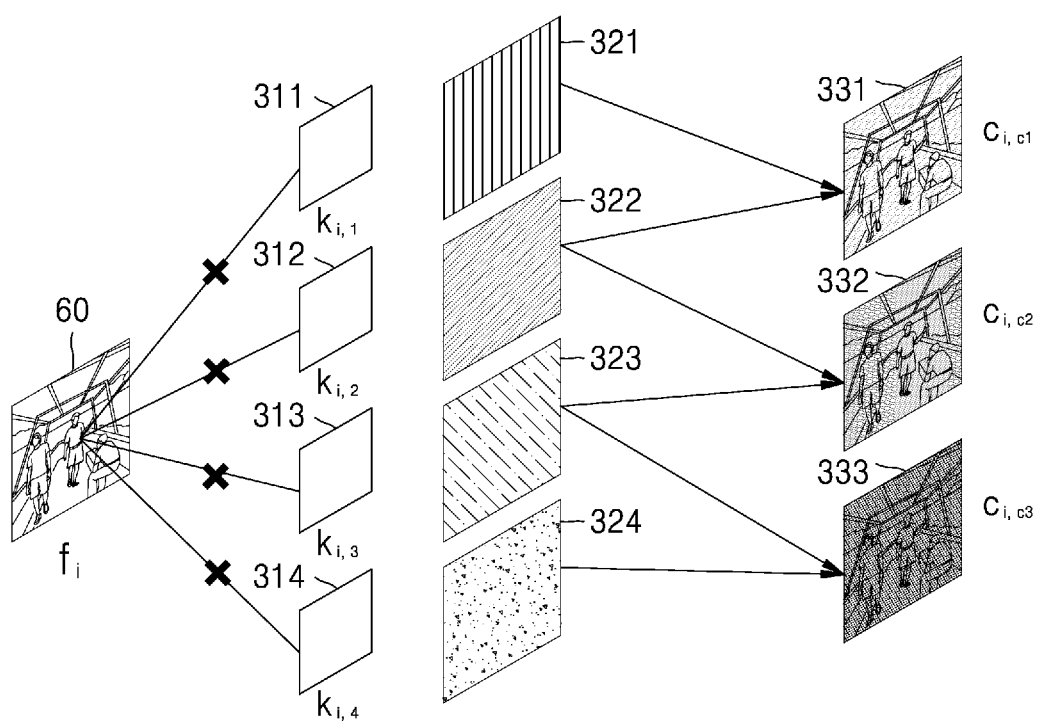
FIG. 3 is a diagram for describing a method of obtaining at least one piece of characteristic information, according to an embodiment of the disclosure.

FIG. 3 is a diagram for describing a method of obtaining at least one piece of characteristic information, according to an embodiment of the disclosure.

The image processing apparatus 100 according to an embodiment of the disclosure may obtain at least one piece of characteristic information by filtering the first feature information 60 obtained from the m-th convolution layer 55. For example, the image processing apparatus 100 may obtain frequency characteristic information by performing filtering using a Gaussian filter or performing discrete cosine transform (DCT) or Wavelet transform.

Referring to FIG. 3, the image processing apparatus 100 may perform a convolution operation on the first feature information 60 by applying four filter kernels, i.e., first through fourth filter kernels 311, 312, 313, and 314. The image processing apparatus 100 may obtain first filtering information 321 by performing a convolution operation between the first feature information 60 and a first filter kernel 311, second filtering information 322 by performing a convolution operation between the first feature information 60 and a second filter kernel 312, third filtering information 323 by performing a convolution operation between the first feature information 60 and a third filter kernel 313, and fourth filtering information 324 by performing a convolution operation between the first feature information 60 and a fourth filter kernel 314. In FIG. 3, four filter kernels are illustrated and described, but the number of filter kernels is not limited thereto. Also, the filter kernel may be a Gaussian kernel, but is not limited thereto.

Weight values of the first through fourth filter kernels 311 through 314 for filtering the first feature information 60 may be pre-set values.

The image processing apparatus 100 may obtain first characteristic information 331 by calculating a difference between the first filtering information 321 and the second filtering information 322, obtain second characteristic information 332 by calculating a difference between the second filtering information 322 and the third filtering information 323, and obtain third characteristic information 333 by calculating a difference between the third filtering information 323 and the fourth filtering information 324.

Here, the first through third characteristic information 331 through 333 may respectively be high frequency characteristic information, middle characteristic feature information, and low frequency characteristic information.

Alternatively, the image processing apparatus 100 according to an embodiment of the disclosure may obtain characteristic information regarding a line from the first feature information 60 by performing Hough transform, Radon transform, or the like.

Alternatively, the image processing apparatus 100 may obtain characteristic information regarding a key-point from the first feature information 60 by performing Harris corner, Shi-Tomasi corner, or the like. However, an embodiment of the disclosure is not limited thereto.

Referring back to FIG. 2, the image processing apparatus 100 according to an embodiment of the disclosure may obtain at least one piece of sub-feature information from the at least one piece of characteristic information 330. For example, first sub-feature information may be obtained via a convolution operation between the at least one piece of characteristic information 330 and a first sub-kernel included in a first sub-convolution layer 400, and second sub-feature information may be obtained via a convolution operation between the at least one piece of characteristic information 330 and a second sub-kernel included in a second sub-convolution layer 500. This will be described with reference to FIGS. 4 and 5.

Figure 4:
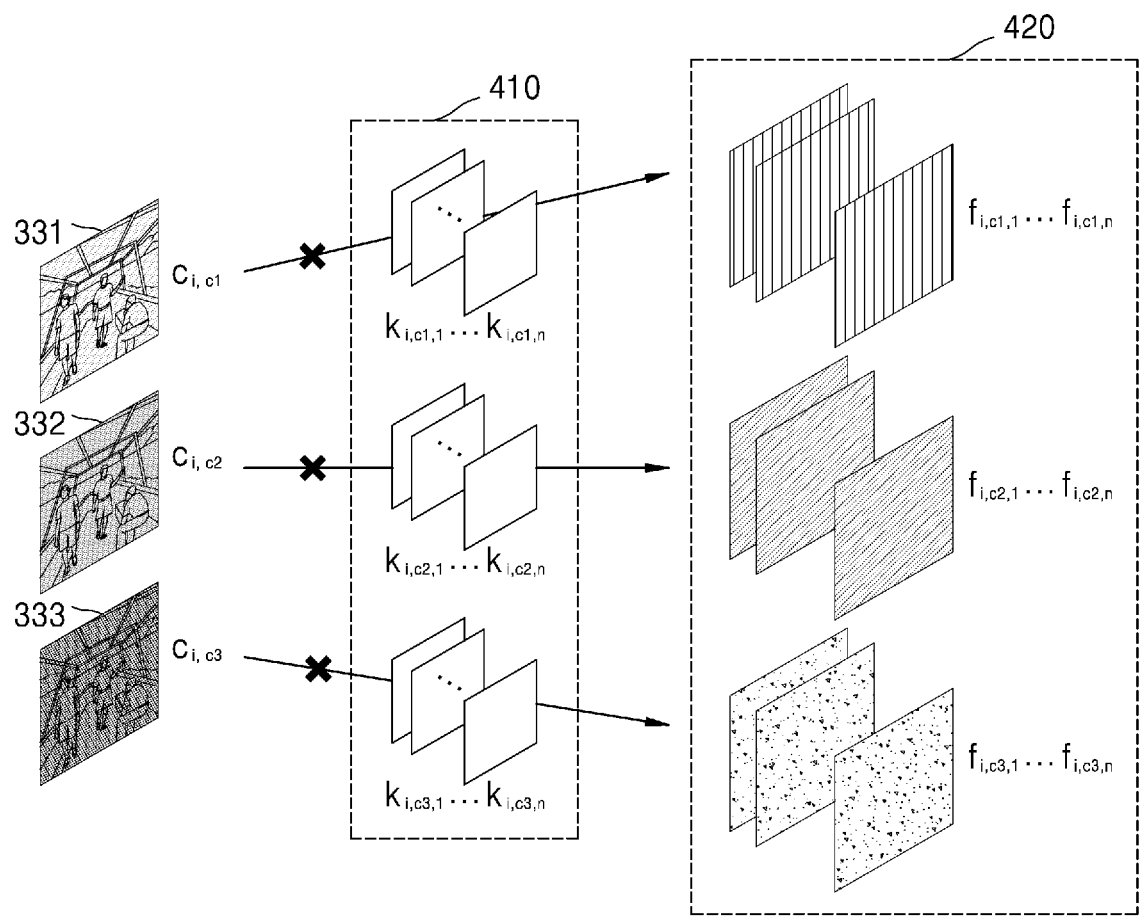
FIG. 4 is a diagram for describing a method, performed by an image processing apparatus, of obtaining at least one piece of sub-feature information from at least one piece of characteristic information, according to an embodiment of the disclosure.
Figure 5:
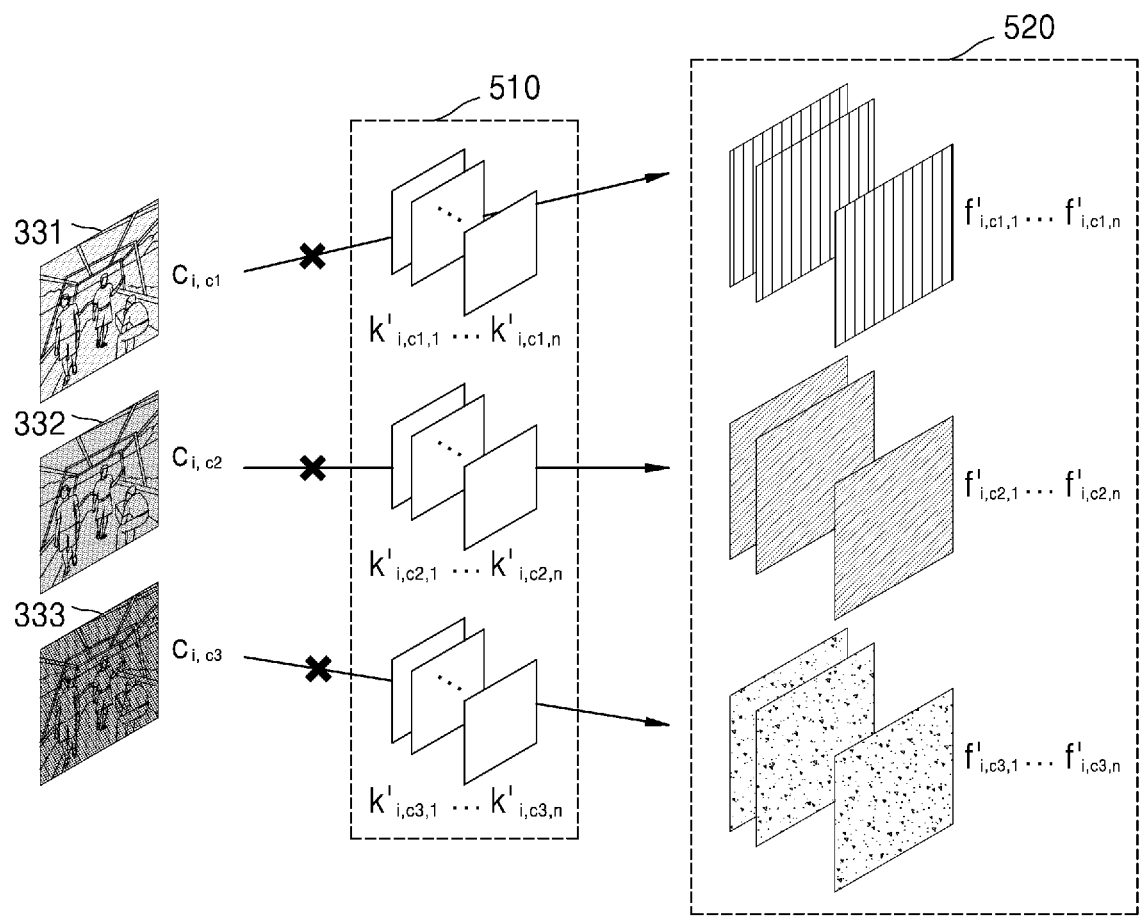
FIG. 5 is a diagram for describing a method, performed by an image processing apparatus, of obtaining at least one piece of sub-feature information from at least one piece of characteristic information, according to an embodiment of the disclosure.

FIGS. 4 and 5 are diagrams for describing a method, performed by the image processing apparatus 100, of obtaining at least one piece of sub-feature information from at least one piece of characteristic information, according to an embodiment of the disclosure.

Referring to FIG. 4, at least one piece of characteristic information according to an embodiment of the disclosure may include the first through third characteristic information 331 through 333. Here, the first through third characteristic information 331 through 333 may be obtained from the first feature information 60 according to an embodiment of the disclosure, and may respectively be high frequency characteristic information, middle frequency characteristic information, and low frequency characteristic information, but are not limited thereto.

The image processing apparatus 100 may obtain pieces of sub-feature information (characteristic feature information) regarding at least one piece of characteristic information, by performing a convolution operation between at least one piece of characteristic information and a sub-kernel.

For example, the image processing apparatus 100 may obtain pieces of first sub-feature information 420 by performing a convolution operation between the first through third characteristic information 331, $C_{i,c1}$ through 333, $C_{i,c3}$ and a first sub-kernel set 410. Here, the first sub-kernel set 410 may include three kernels $k_{i,c1,1}, \ldots, k_{i,c1,n}, k_{i,c2,1}, \ldots, k_{i,c2,n}, k_{i,c3,1}, \ldots, k_{i,c3,n}$ having a depth n, and the obtained pieces of first sub-feature information 420, $f_{i,c1,1}, \ldots, f_{i,c1,n}, f_{i,c2,1}, \ldots, f_{i,c2,n}, f_{i,c3,1}, \ldots, f_{i,c3,n}$ may include three pieces of feature information having the depth n. Here, the depth n may be determined to be a same value as a depth of first feature information obtained from a first convolution layer, but is not limited thereto.

Also, referring to FIG. 5, the image processing apparatus 100 may obtain pieces of second sub-feature information 520, $f'_{i,c1,1}, \ldots, f'_{i,c1,n}, f'_{i,c2,1}, \ldots, f'_{i,c2,n}, f'_{i,c3,1}, \ldots, f'_{i,c3,n}$ by performing a convolution operation between the first through third characteristic information 331 through 333 and a second sub-kernel set 510. Here, the second sub-kernel set 510 may include three kernels $k'_{i,c1,1}, \ldots, k'_{i,c1,n}, k'_{i,c2,1}, \ldots, k'_{i,c2,n}, k'_{i,c3,1}, \ldots, k'_{i,c3,n}$ having the depth n, and the obtained pieces of second sub-feature information 520 may include three pieces of feature information having the depth n. Here, the depth n may be determined to be a same value as a depth of first feature information obtained from a first convolution layer, but is not limited thereto.

Weight values included in the first sub-kernel set 410 and the second sub-kernel set 510 according to an embodiment of the disclosure may be determined via training, and the weight values of the first sub-kernel set 410 and the weight values of the second sub-kernel set 510 may be determined to be different values.

Referring back to FIG. 2, a characteristic combiner 600 may obtain second feature information, based on first feature information, at least one piece of characteristic information, first sub-feature information, and second sub-feature information.

This will be described with reference to FIG. 6.

Figure 6:
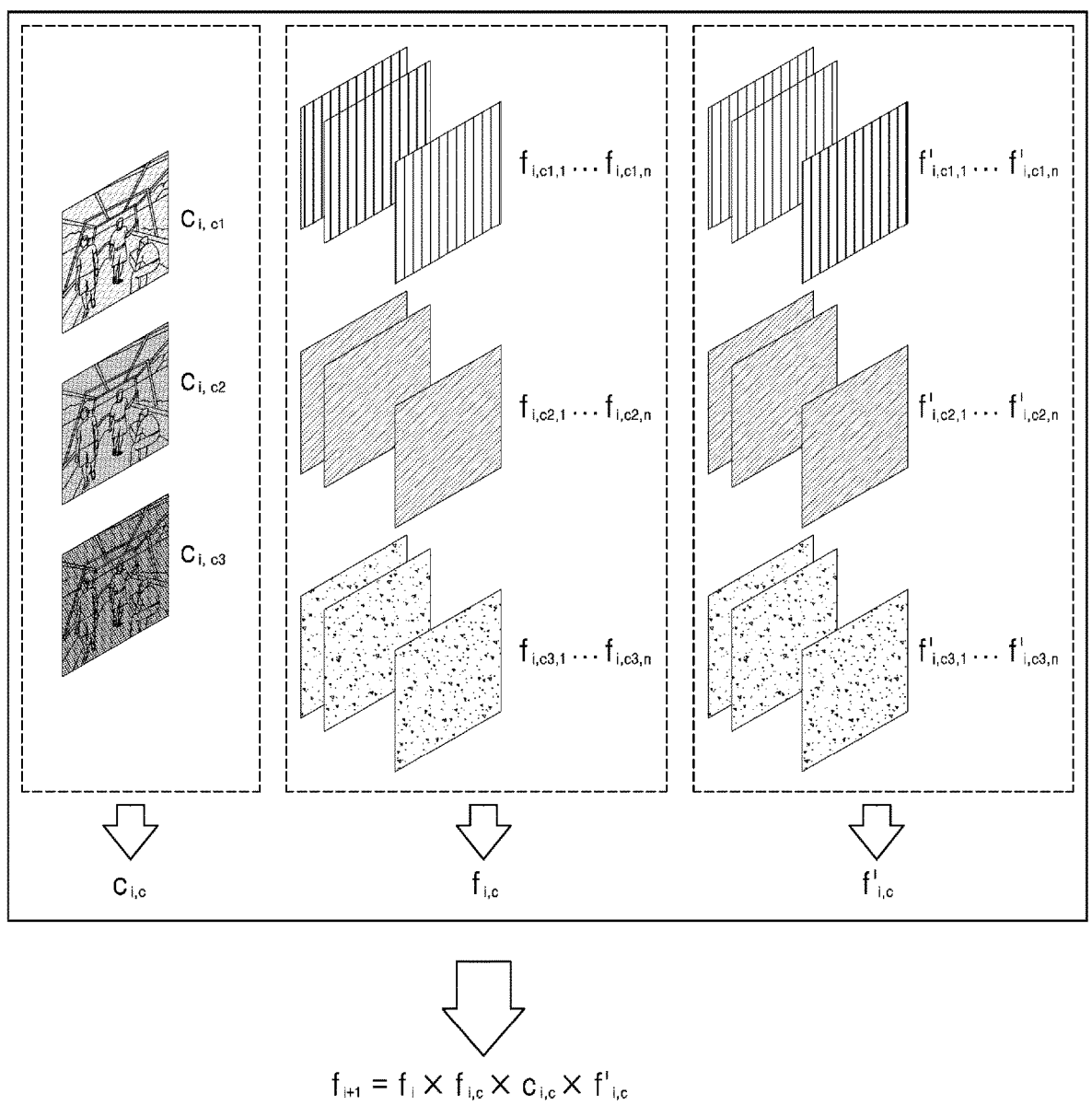
FIG. 6 is a diagram for describing a method, performed by an image processing apparatus, of obtaining second feature information, according to an embodiment of the disclosure.

FIG. 6 is a diagram for describing a method, performed by the image processing apparatus 100, of obtaining second feature information, according to an embodiment of the disclosure.

Referring to FIG. 6, the characteristic combiner 600 may obtain second feature information $f_{i+1}$, based on first feature information $f_i$ obtained from a first convolution layer, at least one piece of characteristic information $C_{i,c}$ ($C_{i,c1}$, $C_{i,c2}$, $C_{i,c3}$) obtained from the first feature information $f_i$, and first sub-feature information $f_{i,c}$ ($f_{i,c1,1}, \ldots, f_{i,c1,n}, f_{i,c2,1}, \ldots, f_{i,c2,n}, f_{i,c3,1}, \ldots, f_{i,c3,n}$) and second sub-feature information $f'_{i,c}$ ($f'_{i,c1,1}, \ldots, f'_{i,c1,n}, f'_{i,c2,1}, \ldots, f'_{i,c2,n}, f'_{i,c3,1}, \ldots, f'_{i,c3,n}$) obtained from the at least one piece of characteristic information $C_{i,c}$.

Here, multiplication may be performed via element-wise multiplication, and to multiply the at least one piece of characteristic information $C_{i,c}$ and the second sub-feature information $f'_{i,c}$, a depth of the at least one piece of characteristic information $C_{i,c}$ may be configured to be the same as a depth n of the second sub-feature information $f'_{i,c}$. Also, addition may be performed via element-wise summation.

The characteristic combiner 600 may obtain the second feature information $f_{i+1}$ by adding a value obtained by multiplying the first feature information $f_i$ and the first sub-feature information $f_{i,c}$ and a value obtained by multiplying the at least one piece of characteristic information $C_{i,c}$ and the second sub-feature information $f'_{i,c}$.

Alternatively, the characteristic combiner 600 may obtain the second feature information $f_{i+1}$ by adding the value obtained by multiplying the first feature information $f_i$ and the first sub-feature information $f_{i,c}$ and the second sub-feature information $f'_{i,c}$.

Referring back to FIG. 2, the obtained second feature information may be input to the m+1-th convolution layer 56, third feature information may be obtained by performing a convolution operation between the input second feature information and a second kernel included in the m+1-th convolution layer 56, and the output image 20 may be obtained based on the third feature information.

Figure 7:
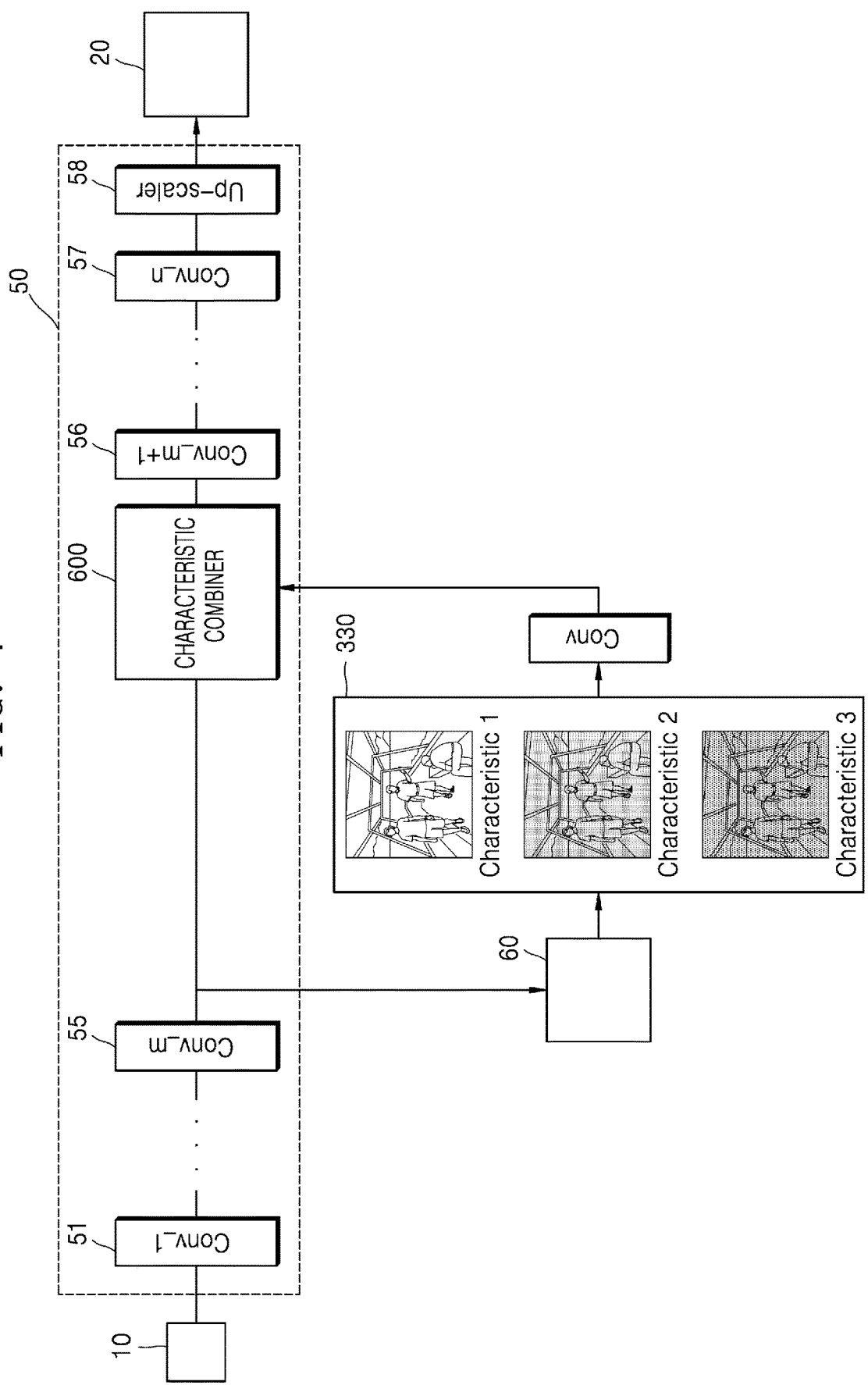
FIG. 7 is a diagram for describing a method, performed by an image processing apparatus, of processing an image, by using a convolution neural network, according to another embodiment of the disclosure.

FIG. 7 is a diagram for describing a method, performed by the image processing apparatus 100, of processing an image, by using the CNN 50, according to another embodiment of the disclosure.

Referring to FIG. 7, the image processing apparatus 100 according to an embodiment of the disclosure may obtain the at least one piece of characteristic information 330, based on the first feature information 60 obtained from the m-th convolution layer 55. Because a method of obtaining at least one piece of characteristic information has been described above with reference to FIG. 3, detailed descriptions thereof are not provided again.

Also, the image processing apparatus 100 may obtain feature information from the at least one piece of characteristic information 330. For example, the image processing apparatus 100 may obtain pieces of sub-feature information by performing a convolution operation between the at least one piece of characteristic information 330 and a sub-kernel set.

The characteristic combiner 600 may obtain the second feature information $f_{i+1}$ by multiplying the first feature information $f_i$ and the first sub-feature information $f_{i,c}$.

Alternatively, the characteristic combiner 600 may obtain the second feature information $f_{i+1}$ by adding the first feature information $f_i$ and the first sub-feature information $f_{i,c}$.

Here, multiplication may be performed via element-wise multiplication and addition may be performed via element-wise summation.

The obtained second feature information $f_{i+1}$ may be input to the m+1-th convolution layer 56, third feature information may be obtained by performing a convolution operation between the input second feature information $f_{i+1}$ and a second kernel included in the m+1-th convolution layer 56, and the output image 20 may be obtained based on the third feature information.

Figure 8:
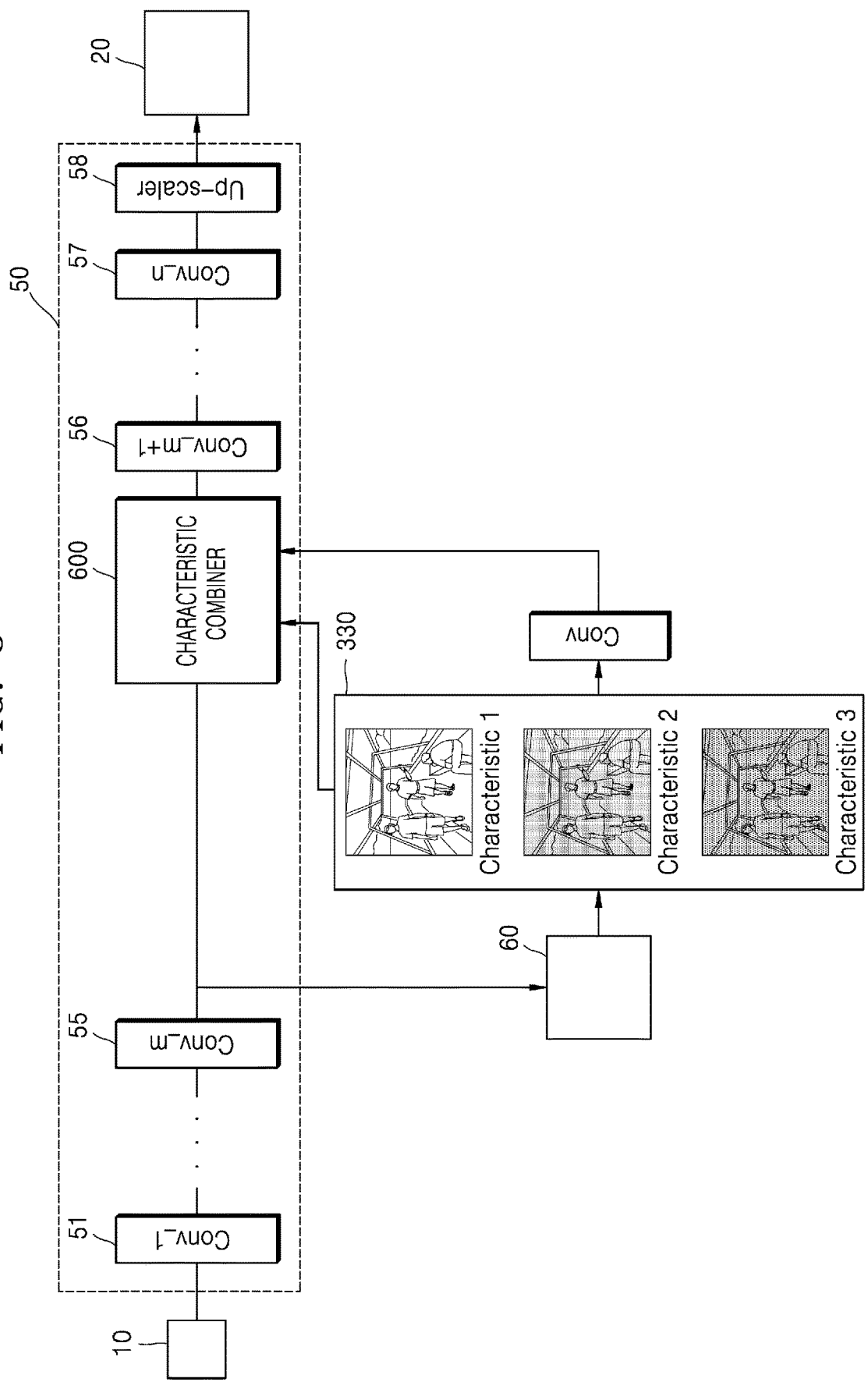
FIG. 8 is a diagram for describing a method, performed by an image processing apparatus, of processing an image, by using a convolution neural network, according to another embodiment of the disclosure.

FIG. 8 is a diagram for describing a method, performed by the image processing apparatus 100, of processing an image, by using the CNN 50, according to another embodiment of the disclosure.

Referring to FIG. 8, the image processing apparatus 100 according to an embodiment of the disclosure may obtain the at least one piece of characteristic information 330, based on the first feature information 60 obtained from the m-th convolution layer 55. Because a method of obtaining at least one piece of characteristic information has been described above with reference to FIG. 3, detailed descriptions thereof are not provided again.

Also, the image processing apparatus 100 may obtain feature information from the at least one piece of characteristic information 330. For example, the image processing apparatus 100 may obtain pieces of sub-feature information by performing a convolution operation between the at least one piece of characteristic information 330 and a sub-kernel set.

The characteristic combiner 600 may obtain the second feature information $f_{i+1}$ by combining the first feature information $f_i$, the at least one piece of characteristic information $C_{i,c}$, and the first sub-feature information $f_{i,c}$.

For example, the characteristic combiner 600 may obtain the second feature information $f_{i+1}$ by adding a value obtained by multiplying the at least one piece of characteristic information $C_{i,c}$ and the first sub-feature information $f_{i,c}$, and the first feature information $f_i$.

Here, multiplication may be performed via element-wise multiplication, and to multiply the at least one piece of characteristic information $C_{i,c}$ and the first sub-feature information $f_{i,c}$, a depth of the at least one piece of characteristic information $C_{i,c}$ may be configured to be the same as a depth n of the first sub-feature information $f_{i,c}$. Also, addition may be performed via element-wise summation.

The obtained second feature information $f_{i+1}$ may be input to the m+1-th convolution layer 56, third feature information may be obtained by performing a convolution operation between the input second feature information $f_{i+1}$ and a second kernel included in the m+1-th convolution layer 56, and the output image 20 may be obtained based on the third feature information.

Figure 9:
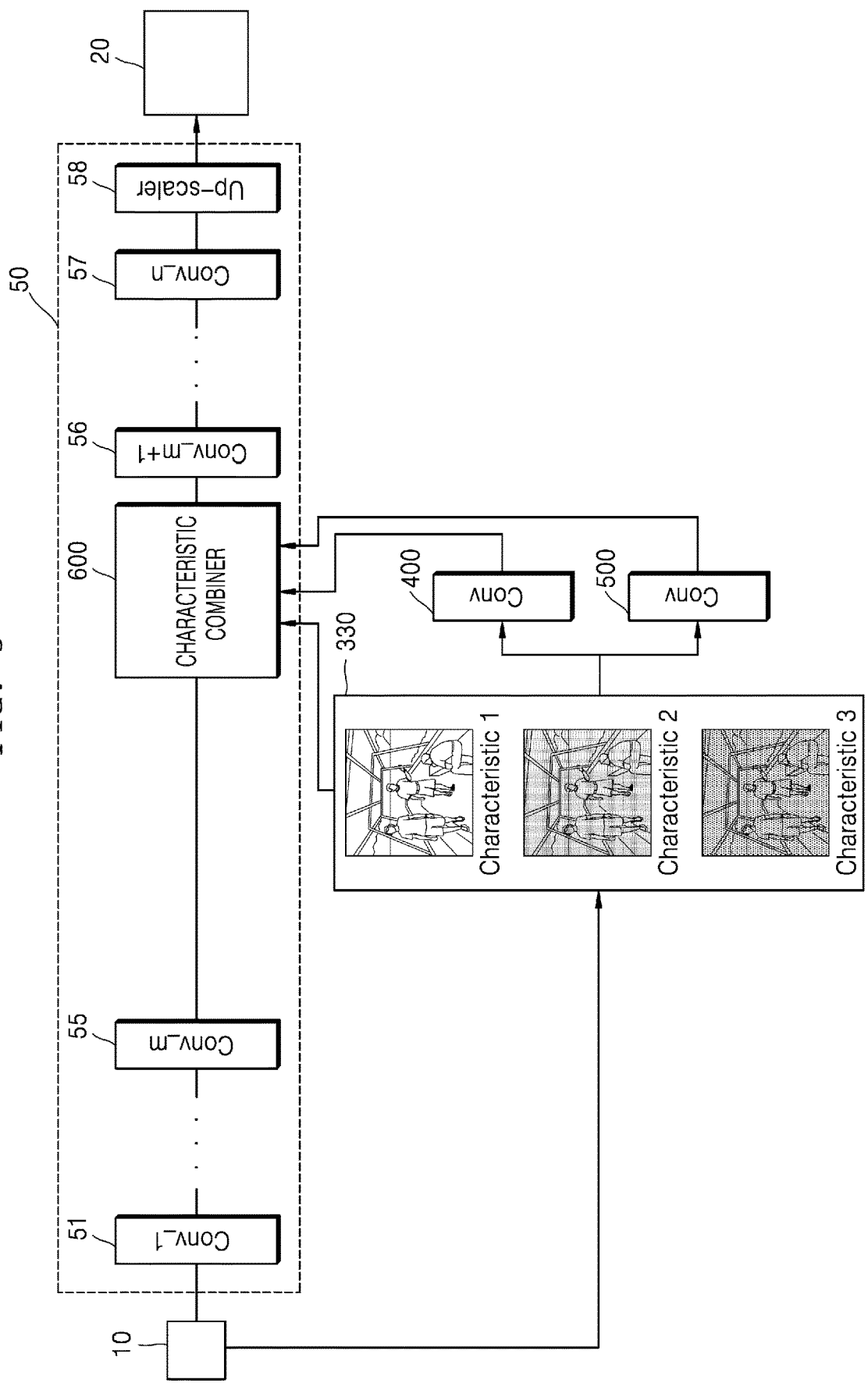
FIG. 9 is a diagram for describing a method, performed by an image processing apparatus, of processing an image, by using a convolution neural network, according to another embodiment of the disclosure.

FIG. 9 is a diagram for describing a method, performed by the image processing apparatus 100, of processing an image, by using the CNN 50, according to another embodiment of the disclosure.

Referring to FIG. 9, the image processing apparatus 100 according to an embodiment of the disclosure may obtain at least one piece of characteristic information 330 from the input image 10. For example, the image processing apparatus 100 may obtain the at least one piece of characteristic information 330 by filtering the input image 10 or transforming the input image 10. Because a method of obtaining at least one piece of characteristic information via filtering has been described above with reference to FIG. 3, detailed descriptions thereof are not provided again.

Also, the image processing apparatus 100 according to an embodiment of the disclosure may obtain at least one piece of sub-feature information from the at least one piece of characteristic information 330. For example, first sub-feature information may be obtained via a convolution operation between the at least one piece of characteristic information 330 and the first sub-kernel included in the first sub-convolution layer 400, and second sub-feature information may be obtained via a convolution operation between the at least one piece of characteristic information 330 and the second sub-kernel included in the second sub-convolution layer 500. Because this has been described in detail with reference to FIGS. 4 and 5, detailed descriptions thereof are not provided again.

The image processing apparatus 100 may obtain the first feature information $f_i$ from the m-th convolution layer 55, and the characteristic combiner 600 may obtain second feature information $f_{i+1}$ based on the first feature information $f_i$, the at least one piece of characteristic information $C_{i,c}$, the first sub-feature information $f_{i,c}$, and the second sub-feature information $f'_{i,c}$.

The obtained second feature information $f_{i+1}$ may be input to the m+1-th convolution layer 56, a convolution operation may be performed between the input second feature information $f_{i+1}$ and the kernel included in the m+1-th convolution layer 56, and the output image 20 may be obtained based thereon.

Figure 10:
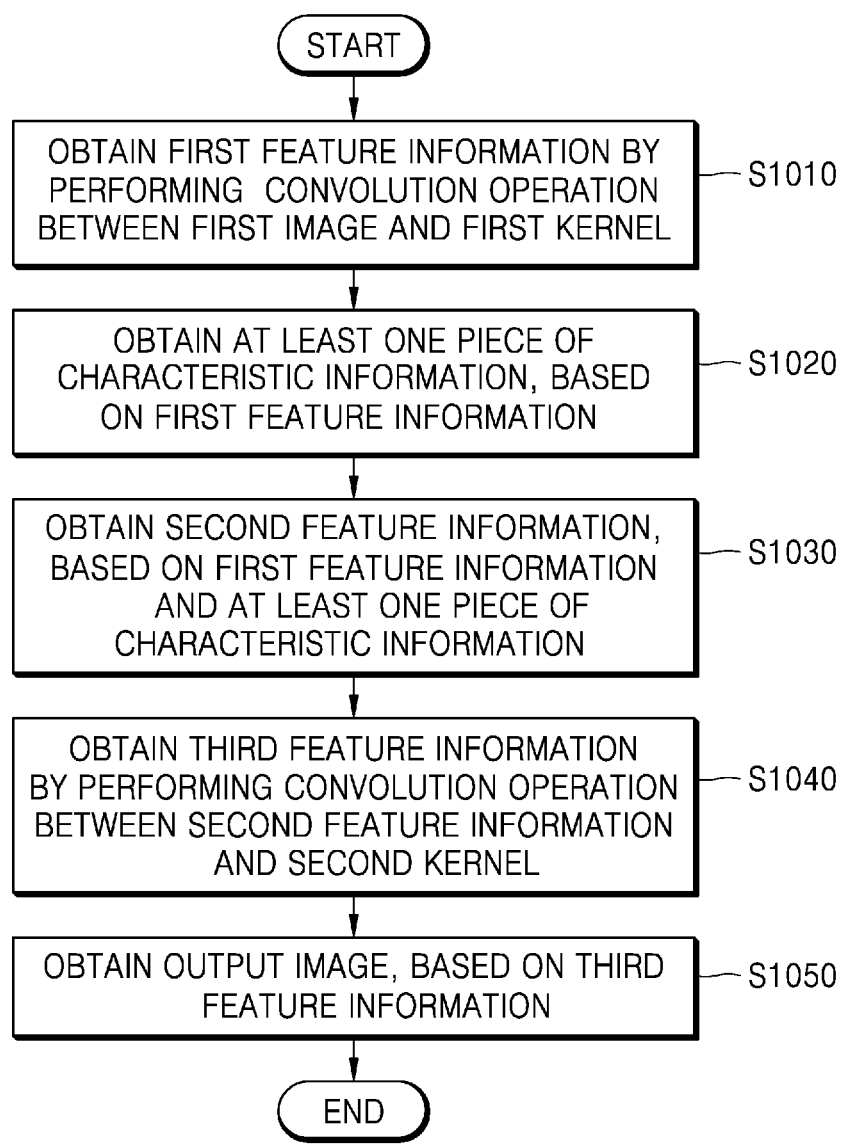
FIG. 10 is a flowchart of an operating method of an image processing apparatus, according to an embodiment of the disclosure.

FIG. 10 is a flowchart of an operating method of the image processing apparatus 100, according to an embodiment of the disclosure.

Referring to FIG. 10, the image processing apparatus 100 according to an embodiment of the disclosure may obtain first feature information by performing a convolution operation between a first image and a first kernel included in a first convolution layer, in operation S1010.

The image processing apparatus 100 according to an embodiment of the disclosure may obtain an output image by processing an input image by using a CNN including n convolution layers. Here, in each convolution layer, a convolution operation may be performed between an image (feature information) input to the convolution layer and a kernel included in the convolution layer, and feature information generated as a result of the convolution operation may be output. The image processing apparatus 100 may obtain the first feature information by performing the convolution operation between the first image input to an m-th convolution layer among the n convolution layers and the first kernel included in the m-th convolution layer. Here, the m-th convolution layer may include at least one convolution layer from among a first convolution layer through an n−1-th convolution layer, but is not limited thereto.

The image processing apparatus 100 according to an embodiment of the disclosure may obtain at least one piece of characteristic information, based on the first feature information, in operation S1020.

The image processing apparatus 100 may obtain the at least one piece of characteristic information by filtering or transforming the first feature information. Because a method of obtaining at least one piece of characteristic information by filtering first feature information has been described above with reference to FIG. 3, detailed descriptions thereof are not provided again.

The image processing apparatus 100 according to an embodiment of the disclosure may obtain second feature information, based on the first feature information and the at least one piece of characteristic information, in operation S1030.

The image processing apparatus 100 may obtain at least one piece of sub-feature information from the at least one piece of characteristic information. For example, the image processing apparatus 100 may perform a convolution operation between the at least one piece of characteristic information and a sub-kernel to obtain the at least one piece of sub-feature information regarding the at least one piece of characteristic information.

The image processing apparatus 100 may obtain the second feature information by combining the first feature information, the at least one piece of characteristic information, and the at least one piece of sub-feature information. Because this has been described in detail with reference to FIG. 6, detailed descriptions thereof are not provided again.

The image processing apparatus 100 may obtain third feature information by inputting the second feature information to a second convolution layer that is a layer next to the first convolution layer and performing a convolution operation between the second feature information and a second kernel included in the second convolution layer, in operation S1040.

The image processing apparatus 100 may obtain an output image, based on the third feature information, in operation S1050.

Figure 11:
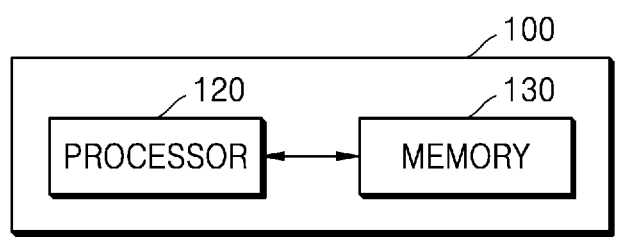
FIG. 11 is a block diagram of a configuration of an image processing apparatus, according to an embodiment of the disclosure.

FIG. 11 is a block diagram of a configuration of the image processing apparatus 100, according to an embodiment of the disclosure.

Referring to FIG. 11, the image processing apparatus 100 according to an embodiment of the disclosure may include a processor 120 and a memory 130.

The processor 120 according to an embodiment of the disclosure may control the image processing apparatus 100 in overall. The processor 120 according to an embodiment of the disclosure may execute at least one program stored in the memory 130.

The memory 130 according to an embodiment of the disclosure may store various types of data, programs, or applications for driving and controlling the image processing apparatus 100. The program stored in the memory 130 may include at least one instruction. The program (e.g., at least one instruction) or application stored in the memory 130 may be executed by the processor 120.

The processor 120 according to an embodiment of the disclosure may obtain first feature information by performing a convolution operation between a first image and a first kernel included in a first convolution layer.

The processor 120 may obtain at least one piece of characteristic information, based on the first feature information. For example, the processor 120 may obtain the at least one piece of characteristic information by filtering or transforming the first feature information. Because a method of obtaining at least one piece of characteristic information has been described above with reference to FIG. 3, detailed descriptions thereof are not provided again.

The processor 120 may obtain at least one piece of sub-feature information from the at least one piece of characteristic information. For example, the processor 120 may perform a convolution operation between the at least one piece of characteristic information and a sub-kernel to obtain the at least one piece of sub-feature information.

Alternatively, the processor 120 may obtain the second feature information, based on the first feature information, the at least one piece of characteristic information, and the at least one piece of sub-feature information.

For example, the processor 120 may obtain the second feature information by adding or multiplying the first feature information and the at least one piece of characteristic information. Alternatively, the processor 120 may obtain the second feature information by adding or multiplying the first feature information and the at least one piece of sub-feature information. Alternatively, the processor 120 may obtain the second feature information by adding the at least one piece of characteristic information to a value obtained by multiplying the first feature information and the at least one piece of characteristic information. Alternatively, the processor 120 may obtain the second feature information by adding the at least one piece of sub-feature information to the value obtained by multiplying the first feature information and the at least one piece of characteristic information. Alternatively, the processor 120 may obtain the second feature information by adding the second sub-feature information to a value obtained by multiplying the first feature information and the first sub-feature information. Alternatively, the processor 120 may obtain the second feature information by adding the first feature information to a value obtained by multiplying the at least one piece of characteristic information and the at least one piece of sub-feature information. Alternatively, the processor 120 may obtain the second feature information by adding a value obtained by multiplying the first feature information and the at least one piece of characteristic information and a value obtained by multiplying the at least one piece of sub-feature information and the at least one piece of characteristic information. Alternatively, the processor 120 may obtain the second feature information by adding a value obtained by multiplying the first feature information and the first sub-feature information and a value obtained by multiplying the at least one piece of characteristic information and the second sub-feature information. Here, multiplication may be performed via element-wise multiplication and addition may be performed via element-wise summation.

The processor 120 may obtain third feature information by performing a convolution operation between the second feature information and a second kernel included in a second convolution layer that is a layer next to the first convolution layer. The processor 120 may obtain an output image, based on the third feature information.

Figure 12:
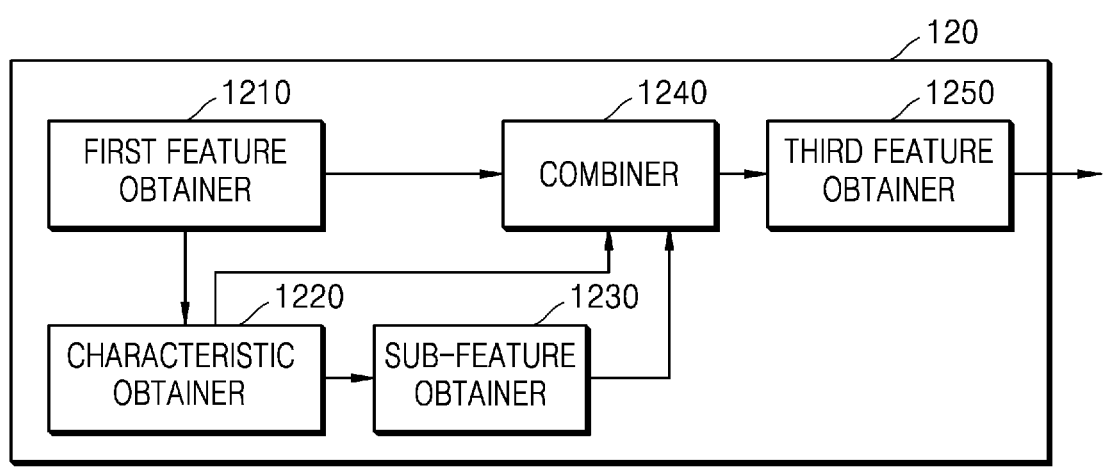
FIG. 12 is a block diagram of a processor according to an embodiment of the disclosure.

FIG. 12 is a block diagram of the processor 120 according to an embodiment of the disclosure.

Referring to FIG. 12, the processor 120 according to an embodiment of the disclosure may include a first feature obtainer 1210, a characteristic obtainer 1220, a sub-feature obtainer 1230, a combiner 1240, and a third feature obtainer 1250.

The first feature obtainer 1210 may obtain first feature information by performing a convolution operation between a first image and a first kernel included in a first convolution layer.

The characteristic obtainer 1220 may obtain at least one piece of characteristic information, based on the first feature information. For example, the characteristic obtainer 1220 may filter or transform the first feature information to extract the at least one piece of characteristic information. Because a method of obtaining at least one piece of characteristic information has been described above with reference to FIG. 3, detailed descriptions thereof are not provided again.

The sub-feature obtainer 1230 may obtain at least one piece of sub-feature information from the at least one piece of characteristic information. For example, the sub-feature obtainer 1230 may perform a convolution operation between the at least one piece of characteristic information and a sub-kernel to obtain the at least one piece of sub-feature information.

The combiner 1240 may obtain second feature information, based on the first feature information, the at least one piece of characteristic information, and the at least one piece of sub-feature information.

For example, the combiner 1240 may obtain the second feature information by adding or multiplying the first feature information and the at least one piece of characteristic information. Alternatively, the combiner 1240 may obtain the second feature information by adding or multiplying the first feature information and the at least one piece of sub-feature information. Alternatively, the combiner 1240 may obtain the second feature information by adding the at least one piece of characteristic information to a value obtained by multiplying the first feature information and the at least one piece of characteristic information. Alternatively, the combiner 1240 may obtain the second feature information by adding the at least one piece of sub-feature information to the value obtained by multiplying the first feature information and the at least one piece of characteristic information. Alternatively, the combiner 1240 may obtain the second feature information by adding the second sub-feature information to a value obtained by multiplying the first feature information and the first sub-feature information. Alternatively, the combiner 1240 may obtain the second feature information by adding the first feature information to a value obtained by multiplying the at least one piece of characteristic information and the at least one piece of sub-feature information. Alternatively, the combiner 1240 may obtain the second feature information by adding a value obtained by multiplying the first feature information and the at least one piece of characteristic information and a value obtained by multiplying the at least one piece of sub-feature information and the at least one piece of characteristic information. Alternatively, the combiner 1240 may obtain the second feature information by adding a value obtained by multiplying the first feature information and the first sub-feature information and a value obtained by multiplying the at least one piece of characteristic information and the second sub-feature information. Here, multiplication may be performed via element-wise multiplication and addition may be performed via element-wise summation.

The third feature obtainer 1250 may obtain third feature information by performing a convolution operation between the second feature information and a second kernel included in a second convolution layer that is a layer next to the first convolution layer.

Meanwhile, at least one of the first feature obtainer 1210, the characteristic obtainer 1220, the sub-feature obtainer 1230, the combiner 1240, or the third feature obtainer 1250 of FIG. 12 may be manufactured in a form of a hardware chip and mounted on the image processing apparatus 120. For example, at least one of the first feature obtainer 1210, the characteristic obtainer 1220, the sub-feature obtainer 1230, the combiner 1240, or the third feature obtainer 1250 may be manufactured in a form of a dedicated hardware chip for artificial intelligence (AI), or may be mounted on various image processing apparatuses by being manufactured as a part of an existing general-purpose processor (for example, a central processing unit (CPU) or application processor) or a graphics-dedicated processor (for example, a graphics processing unit (GPU)).

In this case, the first feature obtainer 1210, the characteristic obtainer 1220, the sub-feature obtainer 1230, the combiner 1240, and the third feature obtainer 1250 may be mounted on one image processing apparatus or each mounted on individual image processing apparatuses.

Also, at least one of the first feature obtainer 1210, the characteristic obtainer 1220, the sub-feature obtainer 1230, the combiner 1240, or the third feature obtainer 1250 may be implemented as a software module. When at least one of the first feature obtainer 1210, the characteristic obtainer 1220, the sub-feature obtainer 1230, the combiner 1240, or the third feature obtainer 1250 is implemented as a software module (or a program module including an instruction), the software module may be stored in a non-transitory computer-readable medium. Also, in this case, at least one software module may be provided by an operating system (OS) or a certain application. Alternatively, a part of the at least one software module may be provided by the OS and the remaining part may be provided by the certain application.

Meanwhile, the block diagrams of the image processing apparatus 100 and processor 120 of FIGS. 11 and 12 are only examples. Based on a specification of the image processing apparatus 100 actually implemented, components may be integrated, another component may be added, or a component may be omitted. In other words, two or more components may be integrated as one component or one component may be divided into two or more components when necessary. Also, a function performed by each block is for describing embodiments of the disclosure and detailed operations or an apparatus do not limit the scope of the disclosure.

An operating method of an image processing apparatus, according to an embodiment of the disclosure may be recorded on a non-transitory computer-readable recording medium by being realized in computer programs executed by using various computers. The non-transitory computer-readable recording medium may include at least one of a program command, a data file, or a data structure. The program commands recorded in the non-transitory computer-readable recording medium may be specially designed or well known to one of ordinary skill in the computer software field. Examples of the non-transitory computer-readable recording medium include hardware apparatuses specially configured to store and perform program commands, such as magnetic media such as hard disks, floppy disks, and magnetic tapes, optical media such as CD-ROMs and DVDs, magneto-optical media such as floptical disks, and ROMs, RAMs, and flash memories. Examples of the computer command include mechanical codes prepared by a compiler, and high-level languages executable by a computer by using an interpreter.

Also, an image processing apparatus and an operating method of the image processing apparatus, according to embodiments of the disclosure, may be provided by being included in a computer program product. The computer program product may be traded between a seller and a buyer as a product.

The computer program product may include software (S/W) program or a non-transitory computer-readable storage medium in which a S/W program is stored. For example, the computer program product may include a product (for example, a downloadable application) in a form of an S/W program distributed electronically through a manufacturer of an electronic apparatus or an electronic market (for example, Google™ Play Store or App Store). For electronic distribution, at least a part of the S/W program may be stored in a storage medium or temporarily generated. In this case, the storage medium may be a server of a manufacturer, a server of an electronic market, or a storage medium of a relay server that temporarily stores a S/W program.

The computer program product may include a storage medium of a server or a storage medium of a client device in a system including the server and the client device. Alternatively, when there is a third device (for example, a smartphone) communicably connected to the server or client device, the computer program product may include a storage medium of the third device. Alternatively, the computer program product may include the S/W program itself transmitted from the server to the client device or to the third device, or transmitted from the third device to the client device.

In this case, one of the server, the client device, and the third device may execute the computer program product to perform the method according to embodiments of the disclosure. Alternatively, two or more of the server, client device, and third device may execute the computer program product to distribute and perform the method according to embodiments of the disclosure.

For example, the server (for example, a cloud server or an AI server) may execute the computer program product stored on the server to control the client device communicably connected to the server to perform the method according to embodiments of the disclosure.

An image processing apparatus according to an embodiment of the disclosure may perform a convolution operation by combining, with existing feature information, at least one characteristic obtained from existing feature information obtained in a CNN, thereby using other characteristics and features that were not obtainable from the existing feature information in the convolution operation, by using the CNN.

At least one piece of characteristic information according to an embodiment of the disclosure may be intentionally obtained, and by performing a convolution operation after combining the intentionally obtained characteristic information with existing feature information, existing features may be maintained while processing an image in an intended direction.

An image processing apparatus according to an embodiment of the disclosure may improve image processing performance without largely increasing hardware complexity.

While the embodiments of disclosure have been particularly described, the scope of the disclosure is not limited thereto, and it will be understood by one of ordinary skill in the art that various changes and modifications using the basic concept of the disclosure defined by the following claims are also within the scope of the disclosure.

What is claimed is:

1. An image processing apparatus comprising:
   a memory storing at least one instruction; and
   a processor configured to execute the at least one instruction stored in the memory to:
   obtain first feature information by performing a convolution operation on a first image and a first kernel included in a first convolution layer among a plurality of convolution layers;
   obtain at least one piece of characteristic information, based on the first feature information;
   obtain at least one sub-feature information by performing a convolution operation on the at least one piece of characteristic information and at least one sub kernel;
   obtain second feature information, based on the first feature information and the at least one sub-feature information;
   obtain third feature information by performing a convolution operation on the obtained second feature information and a second kernel included in a second convolution layer that is a layer next to the first convolution layer among the plurality of convolution layers; and
   obtain an output image, based on the third feature information.

2. The image processing apparatus of claim 1, wherein the processor is further configured to execute the at least one instruction to obtain the at least one piece of characteristic information from the first feature information by performing filtering or conversion on the first feature information.

3. The image processing apparatus of claim 2, wherein the processor is further configured to execute the at least one instruction to obtain frequency characteristic information regarding the first feature information from the first feature information.

4. The image processing apparatus of claim 1, wherein the processor is further configured to execute the at least one instruction to:
   obtain first sub-feature information by performing a convolution operation on the at least one piece of characteristic information and a first sub kernel; and
   obtain the second feature information by combining the first feature information and the first sub-feature information.

5. The image processing apparatus of claim 4, wherein the processor is further configured to execute the at least one instruction to obtain the second feature information, based on the first feature information, the at least one piece of characteristic information, and the first sub-feature information.

6. The image processing apparatus of claim 4, wherein the processor is further configured to execute the at least one instruction to:
   further obtain second sub-feature information by performing a convolution operation on the at least one piece of characteristic information and a second sub kernel; and
   obtain the second feature information, based on the at least one piece of characteristic information, the first feature information, the first sub-feature information, and the second sub-feature information.

7. The image processing apparatus of claim 6, wherein the processor is further configured to execute the at least one instruction to obtain the second feature information by adding a value obtained by multiplying the first feature information and the first sub-feature information and a value obtained by multiplying the at least one piece of characteristic information and the second sub-feature information.

8. An operating method of an image processing apparatus, the operating method comprising:
   obtaining first feature information by performing a convolution operation on a first image and a first kernel included in a first convolution layer among a plurality of convolution layers;
   obtaining at least one piece of characteristic information, based on the first feature information;
   obtain at least one sub-feature information by performing a convolution operation on the at least one piece of characteristic information and at least one sub kernel;

obtaining second feature information, based on the first feature information and the at least one sub-feature information;

obtaining third feature information by performing a convolution operation on the obtained second feature information and a second kernel included in a second convolution layer that is a layer next to the first convolution layer among the plurality of convolution layers; and obtaining an output image, based on the third feature information.

9. The operating method of claim 8, wherein the obtaining of the at least one piece of characteristic information comprises obtaining the at least one piece of characteristic information from the first feature information by performing filtering or conversion on the first feature information.

10. The operating method of claim 9, wherein the obtaining of the at least one piece of characteristic information comprises obtaining frequency characteristic information regarding the first feature information from the first feature information.

11. The operating method of claim 8, wherein the obtaining of the second feature information comprises:

obtaining first sub-feature information by performing a convolution operation on the at least one piece of characteristic information and a first sub kernel; and obtaining the second feature information by combining the first feature information and the first sub-feature information.

12. The operating method of claim 11, wherein the obtaining of the second feature information comprises obtaining the second feature information, based on the first feature information, the at least one piece of characteristic information, and the first sub-feature information.

13. The operating method of claim 11, wherein the obtaining of the second feature information comprises:

further obtaining second sub-feature information by performing a convolution operation on the at least one piece of characteristic information and a second sub kernel; and obtaining the second feature information, based on the at least one piece of characteristic information, the first feature information, the first sub-feature information, and the second sub-feature information.

14. The operating method of claim 13, wherein the obtaining of the second feature information comprises obtaining the second feature information by adding a value obtained by multiplying the first feature information and the first sub-feature information and a value obtained by multiplying the at least one piece of characteristic information and the second sub-feature information.

15. A computer program product comprising at least one non-transitory computer-readable recording medium having stored therein a program for executing the method of claim 8.

16. An image processing apparatus comprising:

a memory storing at least one instruction; and a processor configured to execute the at least one instruction stored in the memory to:

obtain at least one piece of characteristic information from an input signal by filtering or transforming the input signal;

obtain first feature information of the input signal;

obtain first sub-feature information from the at least one piece of characteristic information by performing a convolution operation on the at least one piece of characteristic information and a first sub-kernel in a convolution layer among a plurality of convolution layers;

obtain second sub-feature information from the at least one piece of characteristic information by performing a convolution operation on the at least one piece of characteristic information and a second sub-kernel in a convolution layer among the plurality of convolution layers;

obtain second feature information based on the first feature information, the at least one piece of characteristic information, the first sub-feature information, and the second sub-feature information;

obtain third feature information from the second feature information by performing a convolution operation on the second feature information and a second kernel included in a convolution layer among the plurality of convolution layers; and obtain an output image, based on the third feature information.

* * * * *